BAYLIS & WILLIAMS.
Harvester Rake.
No. 9,528.
Patented Jan. 11, 1853.
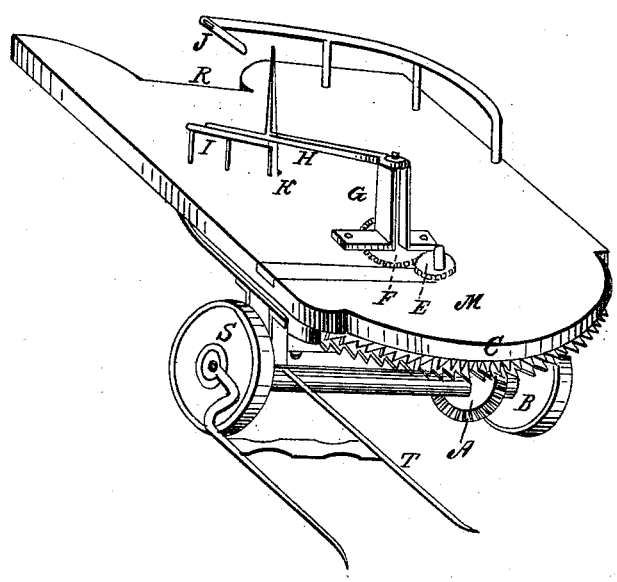

UNITED STATES PATENT OFFICE.

T. BAYLIS AND D. WILLIAMS, OF TECUMSEH, MICHIGAN.

IMPROVEMENT IN RAKES TO HARVESTERS.

Specification forming part of Letters Patent No. 9,528, dated January 11, 1853.

*To all whom it may concern:*

Be it known that we, THOMAS BAYLIS and DANIEL WILLIAMS, of Tecumseh, in the county of Lenawee and State of Michigan, have invented or produced a new and useful Improvement in the Method of Cutting and Raking Grain and Cutting Grass; and we do hereby declare that the following is a full and exact description thereof, reference being had to the accompanying drawing, and the letters of reference marked thereon.

The wheel marked letter B is the principal driving-wheel, runs upon the ground, and, while it in part supports and conveys the machine by the miter-wheel A on the hub of the same, is used to drive the machinery. This miter-wheel A meshes into a wheel attached to the lower portion of the upright shaft, the top of which is seen marked L.

C is a revolving circular knife attached to the central upright shaft, L, and is carried by it, and the cutting part of which knife at the outer edge is made to resemble the teeth of a circular saw.

D is a stationary semicircular form of fingers or teeth lying immediately under the revolving knife C, and extending out into the grain or grass somewhat beyond the teeth of the circular revolving knife, and over the upper surface of which stationary fingers or teeth the grain or grass is cut.

M is a platform covering the arms of the knife, circular in front, and upon which the cut grain falls.

E is a small wheel lying above the platform M, and attached to the upper end of the shaft L, and which meshes into another wheel, (marked F) that drives the rake-arm, (marked H,) with the movable rake-head attached (marked I.) Standing in the rake-arm H is a post, (marked P,) and in the top of the post a small pulley, over which a small cord is passed, with a weight at K, and the other end of the cord is attached to the head of the rake I. This rake describes a circuit upon the platform and gathers the cut wheat into a sheaf, which discharges at the rear of the platform at R.

J is a brake, attached by a movable joint to the side railing at the rear and left of the platform, designed to change the direction of the rake-head at R and aid in discharging the sheaf.

S is a wheel upon the other end of the axle $u$, and corresponding with the driving-wheel B.

T is a pair of shafts, the one attached to the axle between the wheels, and the other outside the wheel S.

Having thus described our machine, what we consider to be the advantages of our improvement and discovery over the mowing and reaping machines now in use are, first, that by the application of continuous rotary motion to the cutting of the grass or grain the entire momentum of the force once acquired is applied to the cutting process, and is not required to be alternately checked and reversed, as in the other methods, thereby securing a very large saving in the amount of power required for successfully driving the machine; second, that by this application of a rotary motion the circular wheel, to the rim of which the cutting-knives are attached, becomes an efficient balance-wheel, thereby steadying and rendering uniform as well as cumulative the cutting power; third, that the form and action of the machine renders feasible the gathering of the cut grain by the circular sweep of the rake-arm and the movable rake-head, which is kept in its place by the cord and weight attached, and that the jointed break secures the uniform discharge of the sheaves at R, being, as we apprehend, a great improvement over any method of raking and discharging the grain hitherto employed; fourth, that the simplicity of the construction and operation of the entire machine renders it much cheaper, more portable, and less likely to get out of repair than is the case with any machine for a similar purpose now in use.

What we claim as our invention and improvement, and desire to secure by Letters Patent, is—

The construction and method of operating the rake together with the use of the jointed brake in facilitating the discharge of the sheaf at the rear of the machine, as set forth.

THOMAS BAYLIS.
DANIEL WILLIAMS.

Witnesses:
BENJ. L. BAXTER,
P. BILLS.